United States Patent Office 3,696,049
Patented Oct. 3, 1972

3,696,049
CORROSION INHIBITING COMPOSITION AND
USE THEREOF
Rudolf H. Hausler, Arlington Heights, and Leonard A. Goeller, Des Plaines, Ill., assignors to Universal Oil Products Company, Des Plaines, Ill.
No Drawing. Filed Apr. 6, 1970, Ser. No. 26,078
Int. Cl. C23f 11/00
U.S. Cl. 252—392
10 Claims

ABSTRACT OF THE DISCLOSURE

A corrosion inhibiting composition of (1) a salt of dicarboxylic acid and aliphatic amine and (2) polymeric reaction product of an epihalohydrin compound and aliphatic amine. The composition is incorporated in any substrate which contacts metal and serves to inhibit corrosion of the metal.

BACKGROUND OF THE INVENTION

In the manufacture, handling, transportation and/or use of various organic substances, corrosion problems occur due to the presence of corrosive materials, including one or more of oxygen, hydrogen sulfide, carbon dioxide, 2 to 4 carbon atom carboxylic acids, hydrogen halide, halogen salts as sodium chloride, ammonium chloride, etc. or mixtures thereof, as well as the presence of water in solution or in suspension in the organic substances. Illustrative organic substances include particularly hydrocarbon distillates as gasoline, jet fuel, kerosene, lubricating oil, fuel oil, diesel oil, crude oil, etc. Other specific oils include cutting oils, soluble oils, slushing oils, rolling, oils, etc., which may be of mineral, animal or vegetable origin. Other organic substances include various coating compositions as grease, wax, household oil, paints, lacquer, etc. Still other organic substances include alcohols, ketones, esters, ethers, dioxane, amino compounds amides etc. In spite of all reasonable and practical precautions which are taken to avoid the presence of water an appreciable quantity of water separation is found as a film or in minute droplets in the pipe line or on container walls or even in small pools at the bottom of the container. This results in corrosion of the metal surfaces and contamination of the organic substance by the corrosion products. In addition to the corrosion described above, corrosion also is encountered in various types of oil wells, including drilling equipment, auxiliary field equipment such as flow lines, separators, tanks, etc., as well as ballast tanks on submersible drilling barges, marine vessels, etc. Corrosion also is encountered in processing equipment including piping, reactors, pumps, heat exchangers, storage tanks, etc.

A myriad of corrosion inhibitors has been proposed heretofore. One class includes various amines, various reaction products of amines, including salts of amines and carboxylic acids, reaction products of amines with epihalohydrin compounds, etc. While many of the prior art inhibitors are very effective for the purpose, there still is a need to even further improve the effectiveness and also the desire to accomplish satisfactory corrosion inhibition with lower amounts of the inhibitor and thus effect economy in this art.

DESCRIPTION OF THE INVENTION

It now has been found that the corrosion inhibiting properties may be enhanced by utilizing a particular mixture of certain additives. As will be demonstrated in the appended examples, corrosion inhibition is obtained with considerably lower amounts of the mixture than is required when using either of the components individually. Accordingly the desired inhibition is accomplished at a considerable savings in cost.

The improved corrosion inhibition is obtained through a mutually related and interdependent coaction between the two components of the mixture. The exact mechanism for these improved results is not fully understood but, after discovery of these improved results, the theory may be advanced that, while one of the components of the mixture possesses corrosion inhibition activity, it also possesses greater dispersant and solvency properties. Accordingly it may be reasoned that the last named component, while contributing to the corrosion inhibition, also serves to extract the other component, which may possess greater inhibiting potency, from the hydrocarbon phase and to carry the other component into contact with the metal surfaces, at which point both components mutually serve to protect the metal surfaces from corrosion. Regardless of the reasons therefor, the mixture of the present invention does result in improved corrosion inhibition and applicants do not wish to be limited to the explanation offered above.

In one embodiment the present invention relates to a corrosion inhibiting composition of (1) from about 50% to about 98% by weight of a salt of a 10–50 carbon atom dicarboxylic acid and a 10–30 carbon atoms aliphatic amine and (2) from about 2% to about 50% by weight of a polymeric reaction product of an epihalohydrin compound and a 10–30 carbon atom aliphatic amine.

As hereinbefore set forth, one component of the composition is a salt of a dicarboxylic acid and an amine. Any suitable dicarboxylic acid may be used and contains from 10 to 50 and preferably from 20 to 40 carbon atoms per molecule. A number of dicarboxylic acids are available commercially, generally as a mixed byproduct and accordingly marketed at a lower cost. One such dicarboxylic acid is marketed under the tradename of "VR–1 Acid." This acid is a mixture of polybasic acids, predominantly dicarboxylic acids, and has an average molecular weight of about 750. Another mixed byproduct acid is marketed commercially under the tradename of "Dimer Acid." Still another such acid is marketed under the tradename of "D–50–MEX" acid.

Still another mixed byproduct acid is marketed commercially under the tradename of "Empol 222." This dimer acid is a dilinoleic acid and is represented by the following general formula:

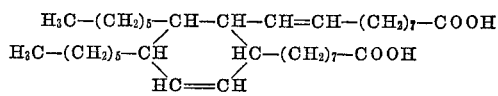

This acid is a viscous liquid, having an apparent molecular weight of aproximately 600. It has an acid value of 180–192, an iodine value of 80–95, a saponification value of 185–195, a neutralization equivalent of 290–310, a refractive index at 25° C. of 1.4919, a specific gravity at 15.5° C./15.5° C. of 0.95, a flash point of 530° F., a fire point of 600° F., and a viscosity at 100° C. of 100 centistokes.

Other dicarboxylic acids include alkyl dicarboxylic acids in which the alkyl contains at least 10 carbon atoms per molecule and thus may comprise alkyl malonic acid, alkyl succinic acid, alkyl glutaric acid, alkyl adipic acid, alkyl pimelic acid, alkyl suberic acid, alkyl azelaic acid, alkyl sebacic acid, alkyl phthalic acid, and higher molecular weight dicarboxylic acids. It is understood that a mixture of acids may be employed.

Any suitable aliphatic amine meeting the requirements hereinbefore set forth may be used in preparing the salt. The amine contains from 10 to 30 and preferably 12 to 20 carbon atoms per molecule. The amine may be a primary aliphatic amine and thus will be selected from decyl amine, undecyl amine, dodecyl amine, tridecyl amine, tetradecyl amine, pentadecyl amine, hexadecyl amine, heptadecyl amine, octadecyl amine, nonadecyl amine, eicosyl amine, heneicosyl amine, docosyl amine, tricosyl amine, tetracosyl amine, pentacosyl amine, hexacosyl amine, heptacosyl amine, octacosyl amine, nonacosyl amine, triacontyl amine, as well as the corresponding alkenyl amines. Conveniently these long chain amines are prepared from fatty acids, the amines being referred to herein as fatty amines, and thus include lauryl amine, myristyl amine, palmityl amine, stearyl amine, arachidyl amine, palmitolyl amine, oleyl amine, ricinoleyl amine, linoleyl amine, linolenyl amine, etc.

Mixtures of fatty amines are available commercially under various tradenames including "Alamine H26D" and "Armeen HTD." These products comprise mixtures predominating in alkyl amines containing 16 to 18 carbon atoms per alkyl group, although they contain a small amount of alkyl groups having 14 carbon atoms. Other mixed fatty amines include tallow amine, coco amine, palm amine, etc., as well as hydrogenated products thereof.

In another embodiment the amine is an N-aliphatic-diaminoalkane having an aliphatic group of at least 8 and preferably of at least 10 carbon atoms. A particularly preferred N-alkyl-diaminoalkane is an N-alkyl - 1,3 - diaminopropane including, for example, N-decyl-1,3-diaminopropane,
N-undecyl-1,3-diaminopropane,
N-dodecyl-1,3-diaminopropane,
N-tridecyl-1,3-diaminopropane,
N-tetradecyl-1,3-diaminopropane,
N-pentadecyl-1,3-diaminopropane,
N-hexadecyl-1,3-diaminopropane,
N-heptadecyl-1,3-diaminopropane,
N-octadecyl-1,3-diaminopropane,
N-nonadecyl-1,3-diaminopropane,
N-eicosyl-1,3-diaminopropane,
N-heneicosyl-1,3-diaminopropane,
N-docosyl-1,3-diaminopropane,
N-tricosyl-1,3-diaminopropane,
N-tetracosyl-1,3-diaminopropane,
N-pentacosyl-1,3-diaminopropane,
N-hexacosyl-1,3-diaminopropane and N-heptacosyl-1,3-diaminopropane.

Here again the aliphatic group conveniently is derived from fatty acids and thus the aliphatic group includes lauryl, myristyl, palmityl, stearyl, arachidyl, palmitolyl, oleyl, ricinoleyl, linoleyl, linolenyl, etc. A number of N-alkyl-1,3-diaminopropanes are available commercially as mixtures and generally at a lower cost. One such mixture is available commercially under the tradename of "Duomeen T" in which the alkyl substituents contain from about 12 to about 20 carbon atoms per group and mostly 16 to 18 carbon atoms. Another mixture is available as "Diam 26." Still another commercially available mixture is "Duomeen O" and comprises N-oleyl-1,3-diaminopropane. Another N-aliphatic-1,3-diaminopropane is "Duomeen LPS" in which the aliphatic group is derived from phenyl stearic acid. This is a mixed acid in which the phenyl group is positioned on either the 9 or 10 carbon atom of the stearyl chain.

It is understood that the particular dicarboxylic acid and the particular amine will be selected with reference to the particular substrate in which the final inhibitor composition is to be used. For example, when used in a hydrocarbon oil, the number of carbon atoms in the dicarboxylic acid and in the amine will be selected so that the salt is readily soluble in the hydrocarbon oil.

The salt is prepared in any suitable manner and is readily prepared by mixing the acid and amine at ambient temperature, preferably with vigorous stirring. When desired, a slightly elevated temperature, which usually will not exceed 200° F., may be employed but excessive temperature should not be used in order to avoid the undesired formation of amides or other reaction products. In a preferred embodiment the acid salt is prepared and this is accomplished by utilizing an excess of carboxylic acid groups in relation to the amino groups as for example, from about 1.2 to about 3 equivalents of acid per 1 equivalent of amine. When the neutral salt is desired, stoichiometric amounts of the acid and amine will be used. When the basic salt is desired, from about 1.2 to about 3 equivalents of amine are used per 1 equivalent of carboxylic acid. When desired, a solvent is utilized, either in forming a more fluid mixture of the acid and/or amine before mixing or during the mixing thereof. Detailed information as to the preparation of a number of such salts is contained in U.S. Pats. 2,868,628 and 3,003,955 and such details are incorporated by reference into the present specifications.

When prepared, the salt may be utilized as such or may be prepared as a solution in a suitable solvent, for subsequent blending with the other component of the composition. The salt may comprise from about 25% to about 75% by weight of the solution. Any suitable solvent may be used and preferably comprises an aromatic hydrocarbon, including benzene, toluene, xylene, ethylbenzene, diethylbenzene, cumene, etc. or a paraffinic hydrocarbon including hexane, heptane, octane, nonane, decane, undecane, dodecane, etc. but preferably comprises a mixture such as naphtha, kerosene, fuel oil, etc. or an aromatic mixture as, for example, an aromatic residue product. These mixed products generally are available at lower cost and appear to satisfactorily serve as solvent.

As hereinbefore set forth, another component of the inhibitor composition of the present invention is a polymeric reaction product of an epihalohydrin compound and an aliphatic amine. While any suitable amine may be used, the amine preferably is selected from the amines hereinbefore specifically set forth.

A preferred epihalohydrin compound is epichlorohydrin. Other epichlorohydrin compounds include 1,2-epi-4 - chlorobutane, 2,3-epi-4-chlorobutane, 1,2-epi-5-chloropentane, 2,3-epi-5-chloropentane, etc. While the chloro derivatives are preferred, it is understood that the corresponding bromo and iodo compounds may be employed. In some cases epihalohydrin compounds may be used. It is understood that the different epihalohydrin compounds are not necessarily equivalent and that, as hereinbefore set forth, epichlorohydrin is preferred.

The reaction of amine and epichlorohydrin is effected in any suitable manner. Preferably the reactants are prepared as solutions in suitable solvents, including the solvents hereinbefore set forth and also including alcohol such as ethanol, propanol, butanol, etc. Conveniently the reaction is effected by heating the epichlorohydrin solution at reflux conditions with stirring, gradually adding the amine thereto and continuing the heating, preferably at a higher temperature, until the reaction is completed, or the reverse order of adding the reactants may be used. In general the temperature will range from about 65° to about 215° F. and preferably from about 120° F. to about 215° F. The time of reaction will be sufficient to effect polymer formation and generally will range from about 2 and preferably from about 4 to 24 hours or more. The organic halide salt, which is formed initially, is converted to an inorganic halide salt, thereby liberating the free amine for further reaction to form the polymeric product. This may be effected in any suitable manner and may be accomplished by reacting the primary reaction product with a strong inorganic base, such as sodium hydroxide, potassium hydroxide, etc., to form the corresponding metal halide. The reaction to form the metal halide is effected at a temperature within the range of from about 130° to about 215° F. and preferably from about 165° to about 195° F. The inorganic base is added in at least two steps with intervening heating and reacting in order to insure liberation of the free amine.

Also it generally is preferred to further heat and react the mixture at a temperature of from about 165° to about 195° F. to insure formation of the desired polymer. The polymeric reaction product may contain from 2 to 20 or more, preferably 3 to 10 recurring units. After formation of the desired polymeric reaction product or prior thereto if desired, the inorganic halide salt is removed in any suitable manner including filtering, centrifugal separation, etc. In some cases it may be of advantage to effect the filtering at an elevated temperature which may be within the range of from about 95° to about 160° F. Detailed information on the preparation of some of these reaction products is contained in U.S. Pat. No. 3,189,652 and such details are incorporated by reference into the present specification.

The polymeric reaction product may be utilized as such for blending with the salt or may be formed as a solution in a suitable solvent. The solvent preferably will be selected from those hereinbefore set forth.

The salt and the polymeric reaction product are commingled in a proportion of from about 50% to about 98% by weight of the salt and from 2% to about 50% by weight of the polymeric reaction product. In a particularly preferred embodiment the salt is in a proportion of from about 90% to about 98% by weight and the polymeric reaction product is in a concentration of about 2% to about 10% by weight. The weight percents used in the present specification and claims are on the basis of active ingredients and do not include solvent or other components incorporated in the inhibitor compositions.

While the salt and the polymeric reaction product may be added separately in the prescribed proportions to the organic substrate, it is preferred to form a blend of the salt and the polymeric reaction prouct and to incorporate the blend into the organic substrate. When desired, the inhibitor composition may also contain one or more other ingredients as, for example, a metal deactivator, such as disalicylaldiaminopropane, ethylenediamine tetra - acetic acid, etc., antioxidants which generally are of the phenolic or amine type, or other additives which normally are incorporated in the substrate. For ease in handling, the final inhibitor composition preferably is prepared as a solution in a suitable solvent, the solvent preferably being selected from those hereinbefore set forth, and conveniently comprises all or a part of the solvent or solvents originally contained in the salt, polymeric reaction product and other components in the final composition.

It is an important advantage of the present invention that the inhibitor composition is utilized in a comparatively low concentration which, as hereinbefore set forth, will be lower than otherwise required when using only the salt or polymeric reaction product. The concentration of the inhibitor composition, based on active ingredients, may be within the range of from 1 to 50 p.p.m. (parts per million) of the substrate, although higher coincentrations up to 1000 p.p.m. may be employed in special situations encountering excessive corrosion.

As hereinbefore set forth the inhibitor composition of the present invention is used in any substrate which contacts metal and corrosion of the metal is encountered. In one embodiment the inhibitor composition is incorporated in a hydrocarbon substrate and will be added to the substrate in the desired concentration, preferably accompanied by some form of mixing in order to obtain uniform distribution of the inhibitor composition, such as for example by the use of a mixing device, pumping of the mixture, recirculation out of and back into a vessel, or in any other suitable manner.

The following examples are introduced to illustrate further the novelty and utiltiy of the present invention but not with the intention of unduly limiting the same.

EXAMPLE I

The salt of this example was prepared by intimately mixing, at slightly elevated temperature, two equivalents of "D-50-MEX" acid and one equivalent of oleyl amine. As hereinbefore set forth, the acid is a mixture of polybasic acids and predominates in dicarboxylic acids. The resultant salt is prepared as a 60% by weight solution in a heavy catalytic naphtha.

EXAMPLE II

Another salt is prepared in substantially the same manner as described in Example I except that the amine used in this example is "Duomeen T" which, as hereinbefore set forth, is N-alkyl-1,3-diaminopropane predominating in alkyl groups containing 16 to 20 carbon atoms. It will be noted that, in Example I, the amine reactant is a primary aliphatic amine, whereas the amine in this example is a diaminoalkane. The salt is prepared as a 30% solution in heavy catalytic naphtha.

EXAMPLE III

The polymeric reaction product of this example was prepared by reacting "Duomeen T" with epichlorohydrin. The reactants were used in substantially equal mole proportions. A solution of epichlorohydrin in alcohol and xylene was charged to a reaction zone and then the desired amount of amine was added in two separate steps. The mixture was stirred and heated to a temperature of 160°–190° F. Subsequently, sodium hydroxide was added in two steps to the reaction mixture, with intervening heating and mixing. After completion of the polymerization, the sodium chloride formed in the reaction was removed by filtering and the alcohol solvent was removed by distillation. The product then is formed as a 50% solution in a xylene solvent.

EXAMPLE IV

The polymeric reaction product of this example is prepared in substantially the same manner as described in Example III except that the amine used is hydrogenated tallow amine. It will be noted that the amine used in Example III is a diaminoalkane, whereas the amine used in this example is a monoamine. Following completion of the reaction, the polymeric reaction product is prepared as a 50% solution in a heavy xylene solvent.

EXAMPLE V

Another polymeric reaction is prepared in substantially the same manner as described in Example III except that the amine used in this example is oleyl amine. The polymeric reaction product is prepared as a 50% solution in an aromatic solvent.

EXAMPLE VI

The corrosion inhibition properties of the mixture of the present invention were determined in a corrosion testing apparatus developed by one of the present applicants and is the subject of a separate application in his name. No novelty is claimed in the present application for the method and apparatus used in these determinations. In general, the method entails preparing a mixture of toluene and water containing 0.0056 N ammonium chloride solution. This mixture, together with 1 atmosphere of hydrogen sulfide, is recirculated over 2 mil thick steel probes. The apparatus provides for measuring the electrical current flowing thru the probe during the test. While maintaining a constant electrical potential, the current measurement is recorded graphically. The decrease in current is directly proportional to the increase in total corrosion. Accordingly, by determining the rate of change in current, the corrosion rate, expressed as m.p.y. (mils per year) is determined.

The base current rate (no inhibitor added) averaged approximately 200 m.p.y. When evaluated in the above manner, the salt prepared as described in Example I, in a total concentration of 3 p.p.m., served to reduce the corrosion rate from an initial of about 200 m.p.y. down to 7 m.p.y., thus showing 97% protection. In another evaluation, using a total concentration of 1 p.p.m. of a mixture of 95% by weight of the salt prepared as described in Example I and 5% by weight of the polymeric reaction product prepared as described in Example III, the base corrosion rate was reduced from about 200 m.p.y. down to 17 m.p.y., thus showing 91% protection. It will be seen that the use of one-third of the total amount of additive served to reduce corrosion to only slightly below that obtained when using 3 times as much of the salt. It is readily apparent that this affords a considerable saving in the cost of the additives.

EXAMPLE VII

In another evaluation made in substantially the same manner as described in Example I except that 2 p.p.m. total concentration of the mixture of 95% by weight of salt and 5% by weight of polymeric reaction product was used. The use of 2 p.p.m. by weight of additive served to reduce the corrosion rate to about 1 m.p.y., thus showing approximately 100% protection against corrosion. Here it will be seen that the use of the mixture in two-thirds of the concentration of the salt served to accomplish substantially complete protection. Thus the use of a lesser amount of the mixture afforded equal or better protection than obtained with a larger concentration of the salt solution.

EXAMPLE VIII

In an evaluation similar to that described in the previous examples, 0.15 p.p.m. of the polymeric reaction product, prepared as described in Example III, was incorporated in the toluene solution. When so evaluated, the polymeric reaction product showed no effect in inhibiting corrosion. Thus, at the low concentrations of the polymeric reaction product as used in Examples VI and VII above, the polymeric reaction product was of no benefit. However, as hereinbefore set forth, the polymeric reaction product does possess corrosion inhibitor properties and, when used alone, must be employed in considerably high concentrations.

EXAMPLE IX

Another advantage to the mixture of the present invention is the good water separometer rating. This is evaluated in the Water Separometer Index Modified Test (WISM). Briefly, in this test, a small volume of water is added to synthetic jet fuel and the fuel is recycled. The reservoir is emptied and the fuel is passed first through a glass wool coalescer pad and then through a photocell, where the percent light transmission is measured as a determination of the turbidity of the fuel mixture. In order to pass this test, the light transmission must be at least 70%.

The mixture as used in Example VI, when evaluated in the water separometer test, had a WISM rating of 94%. When the same mixture was used in a concentration of 1.5 p.p.m., the WISM rating was 89%.

EXAMPLE X

The mixture of this example comprises 85% by weight of the salt prepared as described in Example II and 15% by weight of the polymeric reaction product prepared as described in Example III. As hereinbefore set forth, these concentrations are on the basis of active ingredient. The salt is available as a solution in the solvent and the polymeric reaction product also is available as a solution in the solvent. Accordingly, the mixture will contain the solvents originally present in the individual components and will be a fluid mixture for ease in handling and using. This inhibitor composition is incorporated in fuel oil being transported via pipe line and serves to retard corrosion, as well as passing the water separometer test.

EXAMPLE XI

Another mixture is prepared to contain 90% by weight of the salt prepared as described in Example I and 10% by weight of the polymeric reaction product prepared as described in Example IV. Here again, the mixture will include the solvents originally present in the individual components. The mixture is incorporated into a kerosene stream being pumped into a storage tank, and will serve to inhibit corrosion of the piping and tank equipment.

EXAMPLE XII

The mixture of this example comprises 80% by weight of the salt prepared as described in Example I and 20% by weight of the polymeric reaction product prepared as described in Example V. The mixture is introduced into the overhead line of a crude column and serves to inhibit corrosion of the piping and subsequent heat exchangers, coolers and receivers.

EXAMPLE XIII

The mixture of this example comprises 75% by weight of the salt prepared as described in Example II and 25% by weight of the polymeric reaction product prepared as described in Example V. The mixture is incorporated into gasoline and serves to inhibit corrosion of the metal parts contacted by the gasoline.

We claim as our invention:

1. A corrosion inhibiting composition of (1) from about 50% to about 98% by weight of a salt of a 10–50 carbon atom dicarboxylic acid and a 10–30 carbon atom aliphatic amine having 1 or 2 amino groups and consisting of carbon, hydrogen and nitrogen and (2) from about 2% to about 50% by weight of the polymeric reaction product formed by reacting, at a temperature of about 65° to about 215° F., substantially equimolar proportions of an epihalohydrin compound and a 10–30 carbon atom aliphatic amine as defined in part (1) above, said reaction product having 2 to 20 recurring units.

2. The composition of claim 1 in which the salt is in a concentration of from about 90% to about 98% by weight and the polymeric reaction product is in a concentration of about 2% to about 10% by weight.

3. The composition of claim 1 in which said dicarboxylic acid is a mixed acid containing from about 20 to about 40 carbon atoms per molecule.

4. The composition of claim 1 in which at least one of the aliphatic amines is a mixture of fatty amines predominating in aliphatic groups of from 12 to 20 carbon atoms per molecule.

5. The composition of claim 1 in which at least one of said aliphatic amines is hydrogenated tallow amine.

6. The composition of claim 1 in which at least one of said aliphatic amines is N-tallow-1,3-diaminopropane.

7. The composition of claim 1 in which said epihalohydrin compound is epichlorohydrin.

8. A method of inhibiting corrosion of metallic surfaces which contact a substrate containing corrosive materials, which comprises incorporated therein a corrosion inhibiting concentration of the composition of claim 1.

9. The substrate of claim 8 being hydrocarbon distillate.

10. The substrate of claim 8 being an overhead stream in a hydrocarbon refining process.

References Cited

UNITED STATES PATENTS

| 2,868,628 | 1/1959 | Chenicek | 44—71 X |
| 2,839,465 | 6/1958 | Jones | 252—8.55 E |
| 3,189,652 | 6/1965 | Pollitzer | 44—72 X |
| 3,063,790 | 11/1962 | Pollitzer | 21—2.7 |

MAYER WEINBLATT, Primary Examiner

U.S. Cl. X.R.

21—2.5, 2.7; 252—8.55 E, 146, 148, 390, 396